(12) United States Patent
Tigges

(10) Patent No.: US 8,194,972 B2
(45) Date of Patent: Jun. 5, 2012

(54) METHOD AND SYSTEM FOR TRANSPARENCY ADJUSTMENT AND OCCLUSION RESOLUTION FOR URBAN LANDSCAPE VISUALIZATION

(75) Inventor: Mark H. A. Tigges, North Vancouver (CA)

(73) Assignee: Noregin Assets, N.V., L.L.C., Dover, DE (US)

( * ) Notice: Subject to any disclaimer, the term of this patent is extended or adjusted under 35 U.S.C. 154(b) by 0 days.

(21) Appl. No.: 13/178,813

(22) Filed: Jul. 8, 2011

(65) Prior Publication Data

US 2011/0261069 A1 Oct. 27, 2011

Related U.S. Application Data

(63) Continuation of application No. 11/695,104, filed on Apr. 2, 2007, now Pat. No. 7,983,473.

(60) Provisional application No. 60/790,778, filed on Apr. 11, 2006.

(51) Int. Cl.
*G06K 9/00* (2006.01)

(52) U.S. Cl. ...................................................... 382/154

(58) Field of Classification Search .................. 382/154, 382/173, 214, 255, 284, 299; 345/419–420, 345/629; 715/764, 781
See application file for complete search history.

(56) References Cited

U.S. PATENT DOCUMENTS

| | | |
|---|---|---|
| 3,201,546 A | 8/1965 | Richardson |
| 3,704,938 A | 12/1972 | Fanselow |
| 3,739,739 A | 6/1973 | Brase |
| 3,762,799 A | 10/1973 | Shapiro |
| 4,581,647 A | 4/1986 | Vye |
| 4,630,110 A | 12/1986 | Cotton et al. |
| 4,688,181 A | 8/1987 | Cottrell et al. |
| 4,757,616 A | 7/1988 | Hills |
| 4,790,028 A | 12/1988 | Ramage |
| 4,800,379 A | 1/1989 | Yeomans |
| 4,885,702 A | 12/1989 | Ohba |
| 4,888,713 A | 12/1989 | Falk |
| 4,970,028 A | 11/1990 | Kenyon et al. |
| 4,985,849 A | 1/1991 | Hideaki |

(Continued)

FOREIGN PATENT DOCUMENTS

CA 2350342 11/2002

(Continued)

OTHER PUBLICATIONS

"Non-Final Office Action", U.S. Appl. No. 11/541,778, (Jun. 19, 2009), 36 pages.

(Continued)

*Primary Examiner* — Daniel Mariam
(74) *Attorney, Agent, or Firm* — McAndrews, Held & Malloy, Ltd.

(57) ABSTRACT

According to certain embodiments of the present invention, a graphical presentation is generated from a data representation. A transparency lens is applied to reveal a region-of-interest within an original image. The region-of-interest is occluded by an occluding portion of the original image. The transparency lens includes a focal region having a transparency to reduce occlusion of the region-of-interest by the occluding portion. The transparency lens also includes a shoulder region between the focal region and a foreground of the original image. The shoulder region has decreasing transparency from the focal region to the foreground. In an embodiment, occluding portion is sliced into slices normal to a depth axis of the original image. Transparencies are applied to the slices as a function of depth of the slices to form the shoulder region.

20 Claims, 7 Drawing Sheets

U.S. PATENT DOCUMENTS

| | | |
|---|---|---|
| 4,992,866 A | 2/1991 | Morgan |
| 5,031,918 A | 7/1991 | Brill |
| 5,048,077 A | 9/1991 | Wells et al. |
| 5,175,808 A | 12/1992 | Sayre |
| 5,185,599 A | 2/1993 | Dorrnink et al. |
| 5,185,667 A | 2/1993 | Zimmermann |
| 5,200,818 A | 4/1993 | Neta et al. |
| 5,206,721 A | 4/1993 | Ashida et al. |
| 5,227,771 A | 7/1993 | Kerr et al. |
| 5,250,934 A | 10/1993 | Denber et al. |
| 5,258,837 A | 11/1993 | Gormley |
| 5,269,687 A | 12/1993 | Mott et al. |
| 5,275,019 A | 1/1994 | Pagani |
| 5,309,279 A | 5/1994 | Halstead |
| 5,321,807 A | 6/1994 | Mumford |
| 5,329,310 A | 7/1994 | Liljegren et al. |
| 5,341,466 A | 8/1994 | Perlin et al. |
| 5,369,527 A | 11/1994 | McCracken |
| 5,416,900 A | 5/1995 | Blanchard et al. |
| 5,432,895 A | 7/1995 | Myers |
| 5,451,998 A | 9/1995 | Hamrick |
| 5,459,488 A | 10/1995 | Geiser |
| 5,473,740 A | 12/1995 | Kasson |
| 5,521,634 A | 5/1996 | McGary |
| 5,523,783 A | 6/1996 | Cho |
| 5,528,289 A | 6/1996 | Cortjens et al. |
| 5,539,534 A | 7/1996 | Hino et al. |
| 5,581,670 A | 12/1996 | Bier et al. |
| 5,583,977 A | 12/1996 | Seidl |
| 5,588,098 A | 12/1996 | Chen et al. |
| 5,594,859 A | 1/1997 | Palmer et al. |
| 5,596,690 A | 1/1997 | Stone et al. |
| 5,598,297 A | 1/1997 | Yamanaka et al. |
| 5,610,653 A | 3/1997 | Abecassis |
| 5,613,032 A | 3/1997 | Cruz et al. |
| 5,638,523 A | 6/1997 | Mullet et al. |
| 5,644,758 A | 7/1997 | Patrick |
| 5,651,107 A | 7/1997 | Frank et al. |
| 5,652,851 A | 7/1997 | Stone et al. |
| 5,657,246 A | 8/1997 | Hogan et al. |
| 5,670,984 A | 9/1997 | Robertson et al. |
| 5,680,524 A | 10/1997 | Maples et al. |
| 5,682,489 A | 10/1997 | Harrow et al. |
| 5,689,287 A | 11/1997 | Mackinlay et al. |
| 5,689,628 A | 11/1997 | Robertson |
| 5,721,853 A | 2/1998 | Smith |
| 5,729,673 A | 3/1998 | Cooper et al. |
| 5,731,805 A | 3/1998 | Tognazzini et al. |
| 5,742,272 A | 4/1998 | Kitamura et al. |
| 5,745,166 A | 4/1998 | Rhodes et al. |
| 5,751,289 A | 5/1998 | Myers |
| 5,754,348 A | 5/1998 | Soohoo |
| 5,764,139 A | 6/1998 | Nojima et al. |
| 5,786,814 A | 7/1998 | Moran et al. |
| 5,798,752 A | 8/1998 | Buxton et al. |
| 5,808,670 A | 9/1998 | Oyashiki et al. |
| 5,812,111 A | 9/1998 | Fuji et al. |
| 5,818,455 A | 10/1998 | Stone et al. |
| 5,848,231 A | 12/1998 | Teitelbaum et al. |
| 5,852,440 A | 12/1998 | Grossman et al. |
| 5,872,922 A | 2/1999 | Hogan et al. |
| 5,909,219 A | 6/1999 | Dye |
| 5,923,364 A | 7/1999 | Rhodes et al. |
| 5,926,209 A | 7/1999 | Glatt |
| 5,949,430 A | 9/1999 | Robertson et al. |
| 5,950,216 A | 9/1999 | Amro et al. |
| 5,959,605 A | 9/1999 | Gilblom |
| 5,969,706 A | 10/1999 | Tanimoto et al. |
| 5,973,694 A | 10/1999 | Steele et al. |
| 5,991,877 A | 11/1999 | Luckenbaugh |
| 5,999,879 A | 12/1999 | Yano |
| 6,005,611 A | 12/1999 | Gullichsen et al. |
| 6,037,939 A | 3/2000 | Kashiwagi et al. |
| 6,052,110 A | 4/2000 | Sciammarella et al. |
| 6,057,844 A | 5/2000 | Strauss |
| 6,064,401 A | 5/2000 | Holzman et al. |
| 6,067,372 A | 5/2000 | Gur et al. |
| 6,072,501 A | 6/2000 | Bier |
| 6,073,036 A | 6/2000 | Heikkinen et al. |
| 6,075,531 A | 6/2000 | DeStefano |
| 6,081,277 A | 6/2000 | Kojima |
| 6,084,598 A | 7/2000 | Chekerylla |
| 6,091,771 A | 7/2000 | Seeley et al. |
| 6,108,005 A | 8/2000 | Starks et al. |
| 6,128,024 A | 10/2000 | Carver et al. |
| 6,133,914 A | 10/2000 | Rogers et al. |
| 6,147,709 A | 11/2000 | Martin et al. |
| 6,154,840 A | 11/2000 | Pebley et al. |
| 6,160,553 A | 12/2000 | Robertson et al. |
| 6,184,859 B1 | 2/2001 | Kojima |
| 6,198,484 B1 | 3/2001 | Kameyama |
| 6,201,546 B1 | 3/2001 | Bodor et al. |
| 6,201,548 B1 | 3/2001 | Cariffe et al. |
| 6,204,845 B1 | 3/2001 | Bates et al. |
| 6,204,850 B1 | 3/2001 | Green |
| 6,215,491 B1 | 4/2001 | Gould |
| 6,219,052 B1 | 4/2001 | Gould |
| 6,241,609 B1 | 6/2001 | Rutgers |
| 6,246,411 B1 | 6/2001 | Strauss |
| 6,249,281 B1 | 6/2001 | Chen et al. |
| 6,256,043 B1 | 7/2001 | Aho et al. |
| 6,256,115 B1 | 7/2001 | Adler et al. |
| 6,256,737 B1 | 7/2001 | Bianco et al. |
| 6,266,082 B1 | 7/2001 | Yonezawa et al. |
| 6,271,854 B1 | 8/2001 | Light |
| 6,278,443 B1 | 8/2001 | Amro et al. |
| 6,278,450 B1 | 8/2001 | Arcuri et al. |
| 6,288,702 B1 | 9/2001 | Tachibana et al. |
| 6,304,271 B1 | 10/2001 | Nehme |
| 6,307,612 B1 | 10/2001 | Smith et al. |
| 6,320,599 B1 | 11/2001 | Sciammarella et al. |
| 6,337,709 B1 | 1/2002 | Yamaashi et al. |
| 6,346,938 B1 | 2/2002 | Chan et al. |
| 6,346,962 B1 | 2/2002 | Goodridge |
| 6,359,615 B1 | 3/2002 | Singh |
| 6,381,583 B1 | 4/2002 | Kenney |
| 6,384,849 B1 | 5/2002 | Morcos et al. |
| 6,392,661 B1 | 5/2002 | Tankersley |
| 6,396,648 B1 | 5/2002 | Yamamoto et al. |
| 6,396,962 B1 | 5/2002 | Haffey et al. |
| 6,400,848 B1 | 6/2002 | Gallagher |
| 6,407,747 B1 | 6/2002 | Chui et al. |
| 6,411,274 B2 | 6/2002 | Watanabe et al. |
| 6,416,186 B1 | 7/2002 | Nakamura |
| 6,417,867 B1 | 7/2002 | Hallberg |
| 6,438,576 B1 | 8/2002 | Huang et al. |
| 6,487,497 B2 | 11/2002 | Khavakh et al. |
| 6,491,585 B1 | 12/2002 | Miyamoto et al. |
| 6,504,535 B1 | 1/2003 | Edmark |
| 6,515,663 B1 | 2/2003 | Hung et al. |
| 6,515,678 B1 | 2/2003 | Boger |
| 6,522,341 B1 | 2/2003 | Nagata |
| 6,523,024 B1 | 2/2003 | Yajima et al. |
| 6,542,191 B1 | 4/2003 | Yonezawa |
| 6,552,737 B1 | 4/2003 | Tanaka et al. |
| 6,559,813 B1 | 5/2003 | DeLuca et al. |
| 6,577,311 B1 | 6/2003 | Crosby et al. |
| 6,577,319 B1 | 6/2003 | Kashiwagi et al. |
| 6,584,237 B1 | 6/2003 | Abe |
| 6,590,568 B1 | 7/2003 | Astala et al. |
| 6,590,583 B2 | 7/2003 | Soohoo |
| 6,608,631 B1 | 8/2003 | Milliron |
| 6,612,930 B2 | 9/2003 | Kawagoe et al. |
| 6,631,205 B1 | 10/2003 | Melen et al. |
| 6,633,305 B1 | 10/2003 | Sarfield |
| 6,690,387 B2 | 2/2004 | Zimmerman et al. |
| 6,704,034 B1 | 3/2004 | Rodriguez et al. |
| 6,720,971 B1 | 4/2004 | Yamamoto et al. |
| 6,721,655 B1 | 4/2004 | Utsumi |
| 6,727,910 B2 | 4/2004 | Tigges |
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,760,020 B1 | 7/2004 | Uchiyama et al. |
| 6,768,497 B2 | 7/2004 | Baar et al. |

| | | |
|---|---|---|
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 | 12/2005 | Watanabe |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen |
| 7,173,633 B2 | 2/2007 | Tigges |
| 7,173,636 B2 | 2/2007 | Montagnese |
| 7,194,697 B2 | 3/2007 | Sinclair, II et al. |
| 7,197,718 B1 | 3/2007 | Westerman et al. |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese |
| 7,667,699 B2 | 2/2010 | Komar |
| 7,698,653 B2 | 4/2010 | Roman et al. |
| 7,714,859 B2 | 5/2010 | Shoemaker |
| 7,737,976 B2 | 6/2010 | Lantin |
| 7,761,713 B2 | 7/2010 | Baar |
| 7,773,101 B2 | 8/2010 | Shoemaker |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 | 3/2003 | Card et al. |
| 2003/0061211 A1 | 3/2003 | Shultz et al. |
| 2003/0076363 A1 | 4/2003 | Murphy |
| 2003/0100326 A1 | 5/2003 | Grube et al. |
| 2003/0103063 A1 | 6/2003 | Mojaver et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 | 9/2003 | Nelson et al. |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 | 2/2006 | Kennedy |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0059432 A1 | 3/2006 | Bells |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2009/0141044 A1 | 6/2009 | Shoemaker |
| 2009/0147023 A1 | 6/2009 | Jetha et al. |
| 2009/0172587 A1 | 7/2009 | Carlisle et al. |
| 2009/0265656 A1 | 10/2009 | Jetha |
| 2009/0284542 A1 | 11/2009 | Baar |
| 2010/0026718 A1 | 2/2010 | Jetha |
| 2010/0033503 A1 | 2/2010 | Baar |
| 2010/0045702 A1 | 2/2010 | Doyle |
| 2010/0201785 A1 | 8/2010 | Lantin |
| 2010/0208968 A1 | 8/2010 | Shoemaker et al. |
| 2010/0262907 A1 | 10/2010 | Shoemaker et al. |

FOREIGN PATENT DOCUMENTS

| | | |
|---|---|---|
| CA | 2386560 | 11/2003 |
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |
| JP | 4410465 | 2/2010 |

OTHER PUBLICATIONS

"Non-Final Office Action", U.S. Appl. No. 11/673,038, (Jul. 13, 2009), 45 pages.

"Non-Final Office Action", U.S. Appl. No. 11/410,024, (Jul. 20, 2009), 27 pages.

Smith, et al., "Efficient techniques for wide-angle stereo vision using surface projection models", Retrieved from <http://ieee.org/stamp.jsp?arnumber=17045, (1999), 6 pages.

"Non-Final Office Action", U.S. Appl. No. 11/159,205, (Jul. 27, 2009), 28 pages.

"Advisory Action", U.S. Appl. No. 11/249,493, (Aug. 11, 2009), 5 pages.
"Advisory Action", U.S. Appl. No. 10/705,199, (Aug. 18, 2009), 5 pages.
"Restriction Requirement", U.S. Appl. No. 11/935,222, (Aug. 20, 2009), 6 pages.
"Advisory Action", U.S. Appl. No. 11/249,493, (Sep. 14, 2009), 4 pages.
"Non-Final Office Action", U.S. Appl. No. 12/364,450, (Sep. 30, 2009), 10 pages.
"Notice of Allowance", U.S. Appl. No. 10/358,394, (Oct. 8, 2009), 8 pages.
Robertson, et al., ""The Document Lens"", (1993), pp. 101-108.
"Non-Final Office Action", U.S. Appl. No. 11/935,222, (Feb. 20, 2009), 12 pages.
"Non-Final Office Action", U.S. Appl. No. 11/410,024, (Mar. 11, 2009), 35 pages.
"Foreign Office Action", Application Serial No. 2002-536993, (Mar. 11, 2009), 2 pages.
Notice of Allowance, U.S. Appl. No. 11/401,349, (Apr. 17, 2009), 35 pages.
Schmalstieg, Dieter et al., "Using transparent props for interaction with the virtual table", U.S. Appl. No. 11/410,024, Proceedings of the 1999 symposium on Interactive 3D graphics., (Apr. 26, 1999), 8 pages.
"Non-Final Office Action", U.S. Appl. No. 10/705,199, (May 12, 2009), 46 pages.
"Non-Final Office Action", U.S. Appl. No. 12/388,437, (Jun. 23, 2010), 7 pages.
"Non-Final Office Action", U.S. Appl. No. 12/764,724, (Jul. 1, 2010), 20 pages.
"Non-Final Office Action", U.S. Appl. No. 11/673,038, (Jul. 22, 2010), 39 pages.
"Final Office Action", U.S. Appl. No. 11/691,686, (Sep. 1, 2010), 16 pages.
"Non-Final Office Action", U.S. Appl. No. 11/138,979, (Sep. 17, 2010), 11 pages.
"Advisory Action", U.S. Appl. No. 11/673,038, (Mar. 25, 2010), 3 pages.
"Final Office Action", U.S. Appl. No. 11/159,205, (Mar. 25, 2010), 16 pages.
"Notice of Allowance", U.S. Appl. No. 12/364,450, (Apr. 19, 2010), 4 pages.
"Non-Final Office Action", U.S. Appl. No. 11/236,694, (Apr. 20, 2010), 9 pages.
"Non-Final Office Action", U.S. Appl. No. 12/368,263, (Apr. 30, 2010), 8 pages.
"Non-Final Office Action", U.S. Appl. No. 12/368,267, (Jun. 11, 2010), 12 pages.
"Notice of Allowability", U.S. Appl. No. 12/364,450, (Jun. 18, 2010), 2 pages.
Carpendale, M. Sheelagh T., "A Framework for Elastic Presentation Space", Thesis Simon Fraser University, XP001051168; Chapter 3-5; appendix A,B; (Mar. 1999), pp. 1-271.
"Non Final Office Action", U.S. Appl. No. 11/541,778, (Sep. 29, 2010), 10 pages.
"Final Office Action", U.S. Appl. No. 11/159,205, (Oct. 6, 2010), 16 pages.
"Non Final Office Action", U.S. Appl. No. 11/236,694, (Oct. 13, 2010), 16 pages.
Lieberman, Henry "Power of Ten Thousand—Navigating in Large Information Spaces", Proceedings of the 7th annual ACM symposium on User interface software and technology, Marina del Rey, California, United States, (Nov. 1994), pp. 15-16.
Mills Michael et al., "A Magnifier Tool for Video Data", Proceedings of the SIGCHI conference on Human factors in computing systems, (1992), pp. 93-96.
"Final Office Action", U.S. Appl. No. 11/935,222, (Nov. 24, 2009), 8 pages.
"Final Office Action", U.S. Appl. No. 11/541,778, (Dec. 4, 2009), 12 pages.
"Notice of Allowance", U.S. Appl. No. 11/214,886, (Dec. 15, 2009), 16 pages.

BPAI Decision, U.S. Appl. No. 10/682,298, (Dec. 30, 2009), 14 pages.
"Notice of Allowance", U.S. Appl. No. 11/410,024, (Jan. 4, 2010), 7 pages.
"Final Office Action", U.S. Appl. No. 11/673,038, (Jan. 8, 2010), 33 pages.
"Advisory Action", U.S. Appl. No. 11/541,778, (Feb. 11, 2010), 3 pages.
"Advisory Action", U.S. Appl. No. 11/935,222, (Feb. 4, 2010), 3 pages.
"Restriction Requirement", U.S. Appl. No. 12/368,263, (Mar. 9, 2010), 7 pages.
"Notice of Allowance", U.S. Appl. No. 10/705,199, (Mar. 10, 2010), 18 pages.
"Non Final Office Action", U.S. Appl. No. 11/691,686, (Mar. 18, 2010), 17 pages.
Kline, Richard L., et al., "Improving GUI Accessibility for People with Low Vision", Proceedings of the SIGCHI conference on Human factors in computing systems, (1995), pp. 114-121.
Perlin, Ken et al., "Pad—an alternative approach to the computer interface", International Conference on Computer Graphics and Interactive Techniques. Proceedings of the 20th annual conference on Computer graphics and interactive techniques., (1993), pp. 57-64.
Bier, Eric A., et al., "The Movable Filter as a User Interface Tool—The Video", Conference on Human Factors in Computing Systems Conference companion on Human factors in computing systems, (1995), pp. 413-414.
Carpendale, M.S.T. ""A Framework for Elastic Presentation Space"", Thesis Simon Fraser University, XP001051168; cited in the application, Chapter 3-5; appendix A,B; (Mar. 1999), pp. 1-271.
Carpendale, M.S.T. et al., ""Exploring Distinct Aspects of the Distortion Viewing Paradigm"", Technical Report TR 97-08, School of Computer Science, Simon Fraser University, Burnaby, British Columbia, Canada; (Sep. 1997).
Cowperthwaite, David J., et al., ""Visual Access for 3D Data"", in Proceedings of ACM CHI 96 Conference on Human Factors in Computer Systems, vol. 2 of Short Papers: Alternative Methods of Interaction; (1996), pp. 175-176.
Keahey, T. A., ""Visualization of High-Dimensional Clusters Using Non-Linear Magnification"", Technical Report LA-UR-98-2776, Los Alamos National Laboratory; (1998).
Tigges, M. et al., ""Generalized Distance Metrics For Implicit Surface Modeling"", Proceedings of the Tenth Western Computer Graphics Symposium; (Mar. 1999).
Carpendale, Marianne S. T., "A Framework for Elastic Presentation Space", (Burnaby, British Columbia: Simon Fraser University, 1999).
Bier, Eric A., et al., "Toolglass and Magic Lenses—The See-Through Interface", International Conference on Computer Graphics and Interactive Techniques Proceedings of the 20th annual conference on Computer graphics and interactive techniques, (1993), pp. 73-80.
Bier, Eric A., et al., "Toolglass and Magic Lenses—The See-Through Interface", Conference on Human Factors in Computing Systems Conference companion on Human factors in computing systems, (1994), pp. 445-446.
Kamba, Tomonari, et al., "Using Small Screen Space More Efficiently", CHI 96 Vancouver, BC Canada, (1996), pp. 383-390.
"Final Office Action", U.S. Appl. No. 12/368,263, (Nov. 5, 2010), 7 pages.
"Final Office Action", U.S. Appl. No. 12/764,724, (Nov. 9, 2010), 21 pages.
"Final Office Action", U.S. Appl. No. 11/691,686, (Nov. 22, 2010), 16 pages.
Boots, B.N., "Delauney Triangles: An Alternative Approach to Point Pattern Analysis", Proc. Assoc. Am. Geogr. 6, (1974), p. 26-29.
Sheelagh, M. et al., ""Distortion Viewing Techniques for 3-Dimensional Data"", Information Visualization '96, Proceedins IEEE Symposium on San Francisco, CA, USA, Los Alamitos, CA, USA, IEEE Comput. Soc., US Oct. 28, 1996; XP010201944; ISBN: 0-8186-7668-X (Oct. 28-29, 1996), pp. 46-53, 119.
Leung, Y. K., et al. ""A Review and Taxonomy of Distortion-Oriented Presentation Techniques"", ACM Transactions on Computer-Human Interaction, 'Online! vol. 1, No. 2, XP002252314; Retrieved from the Internet: <URL:http://citeseer.nj.nec.com/leung94review.html> 'retrieved on Aug. 21, 2003! the whole document, (Jun. 1994), pp. 126-160).
"Non Final Office Action", U.S. Appl. No. 10/358,394, (Mar. 13, 2009).
Sarkar, et al., "Stretching the Rubber Sheet: A Metaphor for Viewing Large Layouts on Small Screens", Proc. of the 6th annual ACM symp. on User interface software on technology, Atlanta, GA, (Dec. 1993), p. 81-91.
Carpendale, et al., "Graph Folding: Extending Detail an Context Viewing into a Tool for Subgraph Comparisons", In Proceedings of Graph Drawing 1995, Passau, Germany, (1995), pp. 127-139.
Carpendale, M.S.T. "A Framework for Elastic Presentation Space", http://pages.cpsc.ucalgary.ca/~sheelagh/personal/thesis/, (Nov. 19, 1999).
"Non Final Office Action", U.S. Appl. No. 11/542,120, (Jan. 22, 2009), 20 pages.
Carpendale, M.S.T. et al., ""A Framework for Unifying Presentation Space—, 01UIST, Proceedings of the 14th Annual ACM Symposium on User Interface Software and Technology, Proceedings of UIST '01: ACM Symposium on User Interface Software and Technology, Orlando, FL, USA; XP002249323 2001, New York, NY, USA, ISBN: 1-58113-438-X, (Nov. 14, 2001), pp. 61-70; p. 64.
Ikedo, T ""A Realtime Video-Image Mapping User Polygon Rendering Techniques"", IEEE Intl. conf on Ottawa, ONT, Canada Jun. 3-6, 1997, Los Alamitos, CA, USA; IEE Comput. Soc, US, XP010239181, ISBN: 0-8186-7819-4 Sections 2, 4.4; Multimedia Computing and Systems '97 Proceedings, (Jun. 3, 1997), pp. 127-134.
Bouju, A. et al., ""Client-Server Architecture for Accessing Multimedia and Geographic Databases within Embedded Systems"", Database and Expert Systems Applications, 1999 Proceedings, Tenth International Workshop on Florence, Italy Sep. 1-3, 1999, Los Alamitos, CA, USA, IEEE Comput. Soc., US, XP010352370; ISBN: 0-7695-0281-4, abstract, figure 2, (Sep. 1-3, 1999), pp. 760-764.
Robertson, G et al., "The Document Lens", UIST. Proceedings of the Annual ACM Symposium on User Interface Software and Technology, abstract figures 3,4, (Nov. 3, 1993), pp. 101-108.
Dursteler, Juan C., "The digital magazine of InfoVis.net", Retrieved from: http://www.infovis.net/printMag.php?num=85&lang=2; (Apr. 22, 2002).
"Presentation for CGDI Workshop", Retrieved from: http://www.geoconnections.org/developersCorner/devCornerdevNetwork/meetings/2002.05.30/IDELIX CGDI 20020530 dist.pdf, (May 2002).
Kuederle, Oliver ""Presentation of Image Sequences: A Detail-In-Context Approach"", Thesis, Simon Fraser University; (Aug. 2000), pp. 1-3, 5-10, 29-31.
Microsoft Corp., "Microsoft Paint", Microsoft Corp., (1981-1998), Paint 1-14.
Electronic Magnifying Glasses, IBM Technical Disclosure Bulletin, IBM Corp., New York, US, vol. 37, No. 3; XP000441501, ISSN: 0018-8689 the whole document; (Mar. 1, 1994), pp. 353-354.
Bossen, F. J., ""Anisotropic Mesh Generation With Particles"", Technical Report CMU-CS-96-134, CS Dept, Carnegie Mellon University; (May 1996).
Bossen, F. J., et al., ""A Pliant Method for Anisotropic Mesh Generation"", 5th Intl. Meshing Roundtable; (Oct. 1996), pp. 63-74.
Wilson, et al., ""Direct Volume Rendering Via 3D Textures"", Technical Report UCSC-CRL-94-19, University of California, Santa Cruz, Jack Baskin School of Engineering; (Jun. 1994).
Carpendale, M.S.T. "A Framework for Elastic Presentation Space", PhD thesis, Simon Fraser University; (1999), pp. 69, 72, 78-83, 98-100, 240, and 241.
Keahey, T.A., et al. ""Techniques for Non-Linear Magnification Transformation"", Information Visualization '96, Proceedings IEEE Symposium on, San Francisco, CA, Los Alamitos, CA, USA, IEEE Comput. Soc. US, XP010201943; ISBN: 0-8186-7668-X the whole document, (Oct. 28, 1996), pp. 38-45.
Carpendale, M. Sheelagh T., et al., ""3-Dimensional Pliable Surfaces: For the Effective Presentation of Visual Information"", UIST '95, 8th Annual Symposium on User Interface Software and technology, Proceedings Of The ACM Symposium On User Interface Software and Technology, Pittsburgh, PA, ACM Symposium On User Interface Software and Technology, New York) (1995-, (Nov. 14-17, 1995), pp. 217-226.
Tominski, Christian et al., ""Fisheye Tree Views and Lenses for Graph Visualization"", pp. 1-8.
Keahey, T.A., ""Getting Along: Composition of Visualization Paradigms"", Visual Insights, Inc.; (2001).
Sakamoto, Chikara et al., ""Design and Implementation of a Parallel Pthread Library (PPL) with Parallelism and Portability"", Systems and Computers in Japan, New York, US, vol. 29, No. 2; XP000752780, ISSN: 0882-1666 abstract, (Feb. 1, 1998), pp. 28-35.
Deng, K. et al., ""Texture Mapping with a Jacobian-Based Spatially-Variant Filter",", Proceedings 10th Pacific Conference on Computer Graphics and Applications, Beijing, China, 2002 Los Alamitos, CA, USA, IEEE Comput. Soc., USA; XP00224932, ISBN; 0-7695-1784-6 the whole document, (Oct. 9-11, 2002), pp. 460-461.
Welsh, Michelle "Futurewave Software", Business Wire; (Nov. 15, 1993).
Lamar, et al., "A Magnification Lens for Interactive Volume Visualization", ACM; pp. 1-10.
Fitzmaurice, G. et al., ""Tracking Menus"", UIST; (2003), pp. 71-79.
Stone, et al., "The movable filter as a user interface tool", Proceedings of CHI ACM; (1992), pp. 306-312.
Baudisch, P. et al., ""Halo: a Technique For Visualizing Off-Screen Locations"", CHI; (Apr. 5-10, 2003).
Baudisch, P. et al., ""Drag-And-Pop: Techniques for Accessing Remote Screen Content on Touch-And-Pen-Operated Systems"", Ineract '03, (2003).
Carpendale, M.S.T. et al., ""Making Distortions Comprehensible"", Visual Languages, Proceedings, 1997 IEEE Symposium On Isle of Capri, Italy, Sep. 23-26, 1997, Los Alamitos, CA, USA, IEEE Comput. Soc., US, Sep. 23, 1997; XP010250566, ISBN: 0-8186-8144-6, (Sep. 23-26, 1997), pp. 35-45.
Ito, Minoru et al., ""A Three-Level Checkerboard Pattern (TCP) Projection Method for Curved Surface Measurement"", Pattern Recognition, Pergamon Press Inc., Elmsford, N.Y., US vol. 28, No. 1; XP004014030, ISSN 0031-3203, (1995), pp. 27-40.
Keahey, T A., et al., ""Nonlinear Magnification Fields"", Information Visualization, 1997, Proceedings IEEE Symposium On Phoenix, AZ, USA, Los Alamitos, CA, USA, IEEE Comput. Soc., US; XP010257169; ISBN: 0-8186-8189-6, (Oct. 20-21, 1997), pp. 51-58 and 121.
Rauschenbach, U. ""The Rectangular Fish Eye view as an Efficient Method for the Transmission and Display of Large Images"", Image Processing, ICIP 99, Proceedings, 1999 International Conference On, Kobe, Japan, Oct. 24-28, 1999, Piscataway, NJ, USA, IEEE, US, XP010368852, ISBN 0-7803-5467-2 p. 115, left-hand column—p. 116, paragraph 3, p. 118, paragraph 7.1; (1999), pp. 115-119.
Keahey, T.A., "Nonlinear Magnification", (Indiana University Computer Science), (1997).
Watt, et al., "Advanced Animation and Rendering Techniques", (Addison-Wesley Publishing), (1992), p. 106-108.
Keahey, T.A., ""the Generalized Detail-In-Context Problem"", Information Visualization 1998, Proceedings; IEEE Symposium On Research Triangle, CA, USA; Los Alamitos, CA, USA, IEEE Comput. Soc., US; XP-010313304; ISBN: 0-8186-9093, (Oct. 19-20, 1998), pp. 44-51, 152.
Carpendale, et al., ""3-Dimensional Pliable Surfaces: For the Effective Presentation of Visual Information"", Proceedings of the 8th annual ACM symposium on User interface and software technology; (Dec. 1995).
Carpendale, M S T et al., ""Extending distortion viewing from 2D to 3D"" IEEE Computer Graphics and Applications, IEEE Inc. New York, US, vol. 17, No. 4; XP000927815, ISSN: 0272-1716, (Jul. 1997), pp. 42-51.
Viega, J et al., ""3D magic lenses"", Proceedings of the 9th annual ACM symposium on User interface software and technology; Pub 1996 ACM Press New York, NY, USA; (1996), 51-58.
Cowperthwaite, David J., ""Occlusion Resolution Operators for Three-Dimensional Detail-In-Context"", Burnaby, British Columbia: Simon Fraser University; (2000).

METHOD AND SYSTEM FOR TRANSPARENCY ADJUSTMENT AND OCCLUSION RESOLUTION FOR URBAN LANDSCAPE VISUALIZATION

This application claims priority to and is a continuation of U.S. patent application Ser. No. 11/695,104, filed on Apr. 2, 2007 and issued as U.S. Pat. No. 7,983,473. This application also claims priority from U.S. Pat. Appl. No. 60/790,778. Both of these applications are incorporated herein in their entireties

FIELD OF THE INVENTION

This invention relates to the field of computer graphics processing, and more specifically, to a method and system for generating and adjusting detail-in-context lenses for display in detail-in-context data presentations for applications including transparency adjustment and occlusion resolution for urban landscape visualization.

BACKGROUND OF THE INVENTION

Modern computer graphics systems, including virtual environment systems, are used for numerous applications such as mapping, navigation, flight training, surveillance, and even playing computer games. In general, these applications are launched by the computer graphics system's operating system upon selection by a user from a menu or other graphical user interface ("GUI"). A GUI is used to convey information to and receive commands from users and generally includes a variety of GUI objects or controls, including icons, toolbars, drop-down menus, text, dialog boxes, buttons, and the like. A user typically interacts with a GUI by using a pointing device (e.g., a mouse) to position a pointer or cursor over an object and "clicking" on the object.

One problem with these computer graphics systems is their inability to effectively display detailed information for selected graphic objects when those objects are in the context of a larger image. A user may require access to detailed information with respect to an object in order to closely examine the object, to interact with the object, or to interface with an external application or network through the object. For example, the detailed information may be a close-up view of the object or a region of a digital map image.

While an application may provide a GUI for a user to access and view detailed information for a selected object in a larger image, in doing so, the relative location of the object in the larger image may be lost to the user. Thus, while the user may have gained access to the detailed information required to interact with the object, the user may lose sight of the context within which that object is positioned in the larger image. This is especially so when the user must interact with the GUI using a computer mouse or keyboard. The interaction may further distract the user from the context in which the detailed information is to be understood. This problem is an example of what is often referred to as the "screen real estate problem".

Now, the growth of the Internet and online map presentation technologies has resulted in broad availability of online and interactive presentation of maps and geographically relevant photographic images. Similarly, geospatial software applications and online services such as Google Earth™ have provided online access to photorealistic representations of cities, in some cases with knowledge of the locations and representative geometry of buildings. However, in such urban landscape presentations, one of the areas of concern is occlusion of buildings or other entities of interest (i.e., regions-of-interest, objects-of-interest) to the user by buildings that are in the line of sight between the user and a building that may be of interest. For example, a user may have a potential interest in the existence of a building housing a bookstore or coffee shop on the next block but may not be aware of it because of buildings near his present viewing location that occlude the building of potential interest. Various approaches to occlusion resolution have been attempted for 3D visualization, such as the 3D lens approach of Cowperthwaite (see U.S. Pat. No. 6,798,412 to Cowperthwaite, which is incorporated herein by reference) and the building height adjustment of Yano (see U.S. Pat. No. 5,999,879 to Yano, which is incorporated herein by reference). However, these approaches cause displacements of building locations and/or building height adjustments that can be very disorienting to the user, and can be expensive in terms of the required computations.

A need therefore exists for an improved method and system for generating and adjusting detailed views of selected information within the context of surrounding information presented on the display of a computer system. Accordingly, a solution that addresses, at least in part, the above and other shortcomings is desired.

SUMMARY OF THE INVENTION

According to one aspect of the invention, there is provided a method for generating a presentation of a region-of-interest within an original image for display on a display screen, the region-of-interest being at a depth within the original image and being occluded by a portion of the original image at a lesser depth, the method comprising: applying graduated transparency to the original image to generate the presentation, the graduated transparency reducing occlusion of the region-of-interest by making transparent at least some of the portion of the original image occluding the region-of-interest, the graduated transparency when applied renders within the presentation a focal region having a maximum level of transparency at the depth of and for the region-of-interest at least partially surrounded by a shoulder region where transparency decreases with lessening depth from the maximum level to that of the original image surrounding the shoulder region to provide context for the focal region with respect to the original image; and, displaying the presentation on the display screen.

In the above method, the region-of-interest may be a first object and the portion of the original image at the lesser depth may be a second object. The first and second objects may be modelled as first and second convex polygons, respectively. The method may further include dividing the second polygon into one or more slices, each slice being made at a respective depth into the representation. The method may further include assigning each slice a respective level of transparency that increases with depth to thereby apply the graduated transparency. The original image may be an urban landscape image. The first and second objects may be first and second buildings, respectively. The method may further include receiving a signal for adjusting the maximum level of transparency in the focal region. The signal for adjusting the maximum level of transparency may be received through a slide bar icon. The maximum level of transparency may be fully transparent. The method may further include receiving a signal for adjusting the transparency in the shoulder region. The signal for adjusting the transparency may be received through a slide bar icon. The method may further include receiving a signal for adjusting an extent of the focal region. The signal for adjusting the extent of the focal region may be received through at least one handle icon positioned on a perimeter of the focal region. The method may further include receiving a signal for adjusting an extent of the shoulder region. The signal for adjusting the extent of the shoulder region may be received through at least one handle icon positioned on a perimeter of the shoulder region. The focal region may include a magnification for the region-of-interest and the magnification may decrease in the shoulder region to that of the original image surrounding the shoulder region. The method may further include receiving a signal for adjusting the magnification. The signal for adjusting the magnification may be received through a slide bar icon. The original image may be a computer aided design ("CAD") image. And, the CAD image may be an image of a three-dimensional mechanical assembly and the first and second objects may be first and second components, respectively, of the mechanical assembly.

In accordance with further aspects of the present invention there is provided an apparatus such as a data processing system, a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
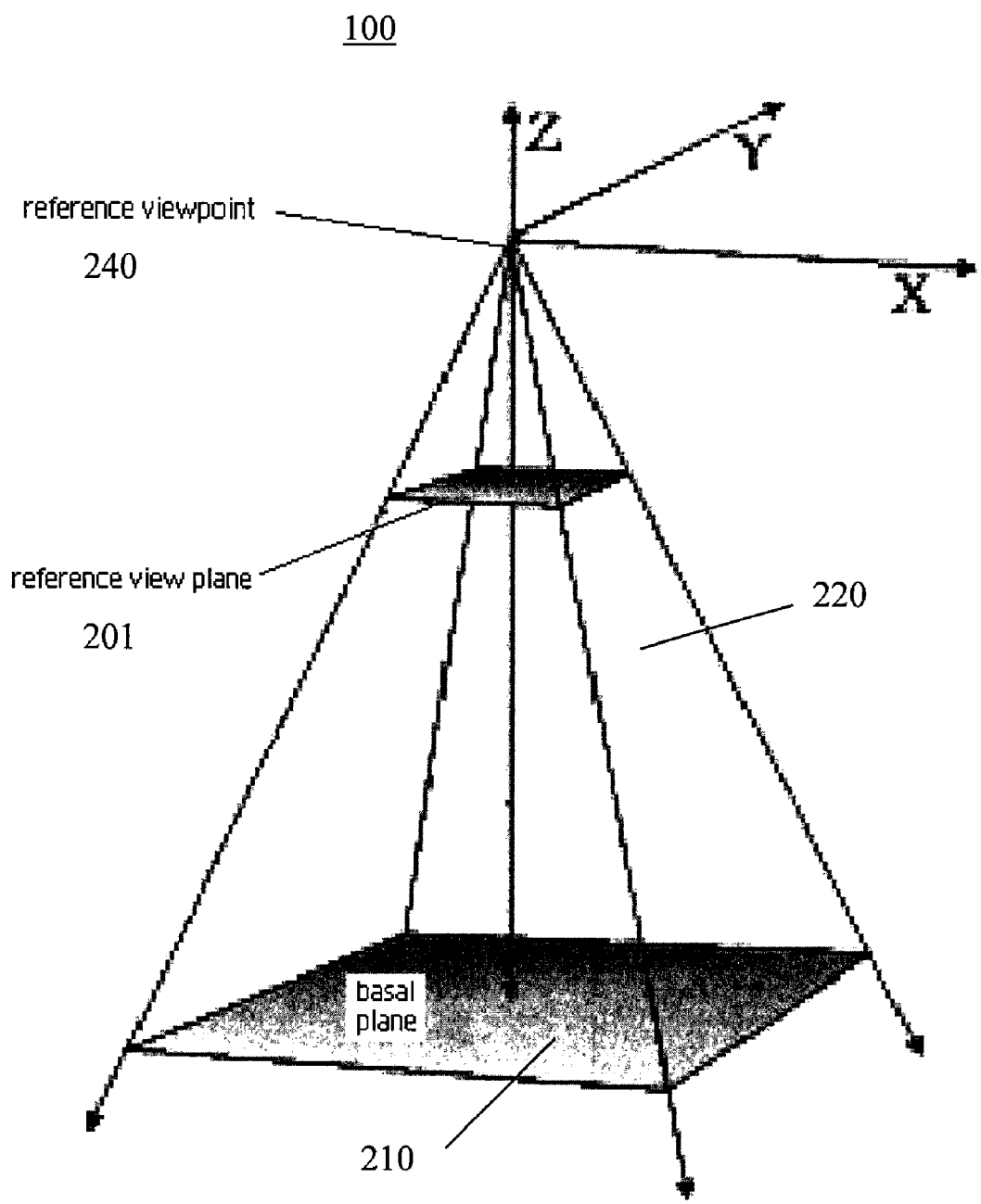
FIG. 1 is a graphical representation illustrating the geometry for constructing a three-dimensional perspective viewing frustum, relative to an x, y, z coordinate system, in accordance with elastic presentation space graphics technology and an embodiment of the invention.

In the following description, details are set forth to provide an understanding of the invention. In some instances, certain software, circuits, structures and methods have not been described or shown in detail in order not to obscure the invention. The term "data processing system" is used herein to refer to any machine for processing data, including the computer systems and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

The "screen real estate problem" generally arises whenever large amounts of information are to be displayed on a display screen of limited size. Known tools to address this problem include panning and zooming. While these tools are suitable for a large number of visual display applications, they become less effective where sections of the visual information are spatially related, such as in layered maps and three-dimensional representations, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g., digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation or image where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e., the context), the result typically giving the appearance of a lens having been applied to the display surface. Using techniques such as those described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and, the surface is manipulated to effect the reorganization of image details. The presentation transformation is separated into two steps: surface manipulation or distortion; and, perspective projection.

FIG. 1 is a graphical representation illustrating the geometry 100 for constructing a three-dimensional ("3D") perspective viewing frustum 220, relative to an x, y, z coordinate system, in accordance with elastic presentation space (EPS) graphics technology and an embodiment of the invention. In EPS technology, detail-in-context views of two-dimensional ("2D") visual representations are created with sight-line aligned distortions of a 2D information presentation surface within a 3D perspective viewing frustum 220. In EPS, magnification of regions-of-interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the magnified and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
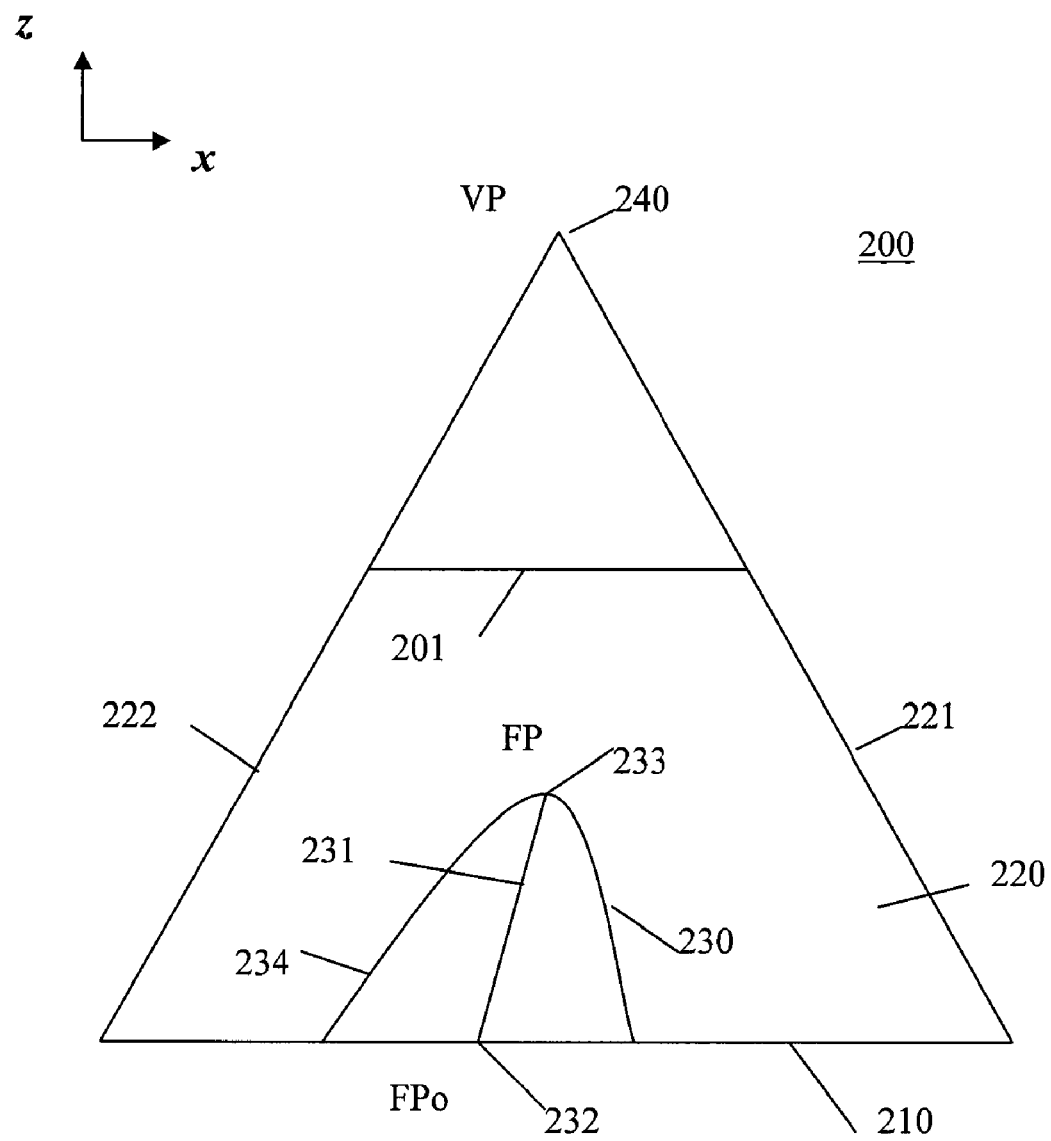
FIG. 2 is a graphical representation illustrating the geometry of a presentation in accordance with elastic presentation space graphics technology and an embodiment of the invention.

FIG. 2 is a graphical representation illustrating the geometry 200 of a presentation in accordance with EPS graphics technology and an embodiment of the invention. EPS graphics technology employs viewer-aligned perspective projections to produce detail-in-context presentations in a reference view plane 201 which may be viewed on a display. Undistorted 2D data points are located in a base plane 210 of a 3D perspective viewing volume or frustum 220 which is defined by extreme rays 221 and 222 and the base plane 210. The VP 240 is generally located above the centre point of the base plane 210 and reference view plane ("RVP") 201. Points in the base plane 210 are displaced upward onto a distorted surface or "lens" 230 which is defined by a general 3D distortion function (i.e., a detail-in-context distortion basis function or simply a distortion function). The direction of the perspective projection corresponding to the distorted surface 230 is indicated by the line FPo-FP 231 drawn from a point FPo 232 in the base plane 210 through the point FP 233 which corresponds to the focal point, focus, or focal region 233 of the distorted surface 230. Typically, the perspective projection has a direction 231 that is viewer-aligned (i.e., the points FPo 232, FP 233, and VP 240 are collinear).

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e., the context) 234, the end result typically giving the appearance of a distorted surface, distortion function, or lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region 233 and the shoulder region 234. Typically, the distorted surface, distortion function, or lens 230 provides a continuous or smooth transition from the base plane 210 through the shoulder region 234 to the focal region 233 as shown in FIG. 2. However, of course, the distorted surface, distortion function, or lens 230 may have a number of different shapes (e.g., truncated pyramid, etc.). To reiterate, the source image, original image, or representation to be viewed is located in the base plane 210. Magnification 233 and compression 234 are achieved through elevating elements of the original image relative to the base plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 210, 234 the local region-of-interest 233.

For example, and referring to FIGS. 1 and 2, in two dimensions, EPS can be implemented through the projection of an image onto a reference plane 201 in the following manner. The source image, original image, or representation is located on a base plane 210, and those regions-of-interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the base plane 210 are described as lenses, lens types, lens functions, or distortion functions. Lens functions that describe basic lens types with point and circular focal regions, as well as certain more complex lenses and advanced capabilities such as folding, have previously been described by Carpendale.

Figure 3:
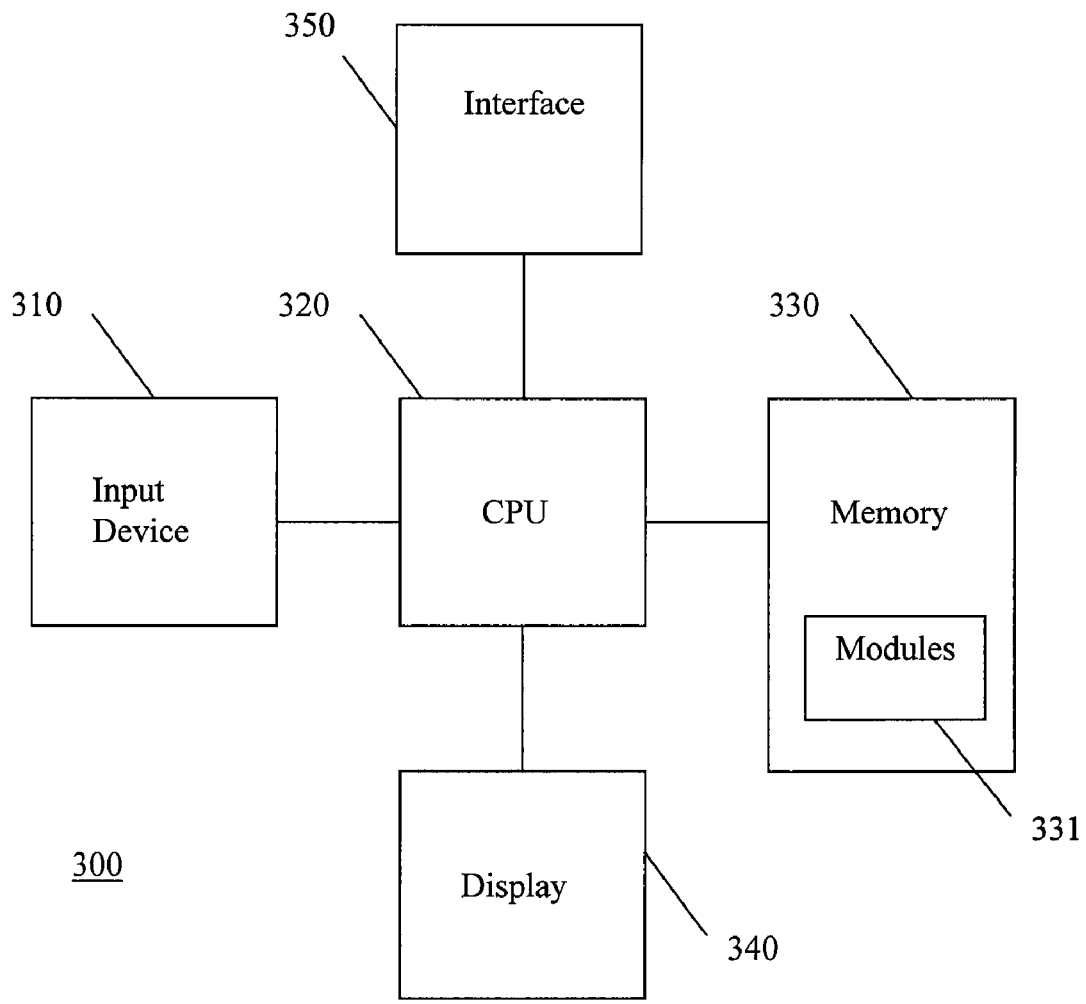
FIG. 3 is a block diagram illustrating a data processing system adapted for implementing an embodiment of the invention.

FIG. 3 is a block diagram of a data processing system 300 adapted to implement an embodiment of the invention. The data processing system 300 is suitable for generating, displaying, and adjusting detail-in-context lens presentations in conjunction with a detail-in-context graphical user interface (GUI) 400, as described below. The data processing system 300 includes an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The CPU 320 may include dedicated coprocessors and memory devices. The memory 330 may include RAM, ROM, databases, or disk devices. The display 340 may include a computer screen, terminal device, a touch sensitive display surface or screen, or a hardcopy producing output device such as a printer or plotter. And, the interface device 350 may include an interface to a network (not shown) such as the Internet and/or another wired or wireless network. Thus, the data processing system 300 may be linked to other data processing systems (not shown) by a network (not shown). For example, the data processing system 300 may be a client and/or server system. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware or software modules 331 which may be resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

As mentioned, detail-in-context presentations of data using techniques such as pliable surfaces, as described by Carpendale, are useful in presenting large amounts of information on limited-size display surfaces. Detail-in-context views allow magnification of a particular region-of-interest (e.g., the focal region) 233 in a data presentation while preserving visibility of the surrounding information 210, 234. In the following, a GUI 400 is described having lens control elements that can be implemented in software (and/or hardware) and applied to the control of detail-in-context data presentations. The software (and/or hardware) can be loaded into and run by the data processing system 300 of FIG. 3.

Figure 4:
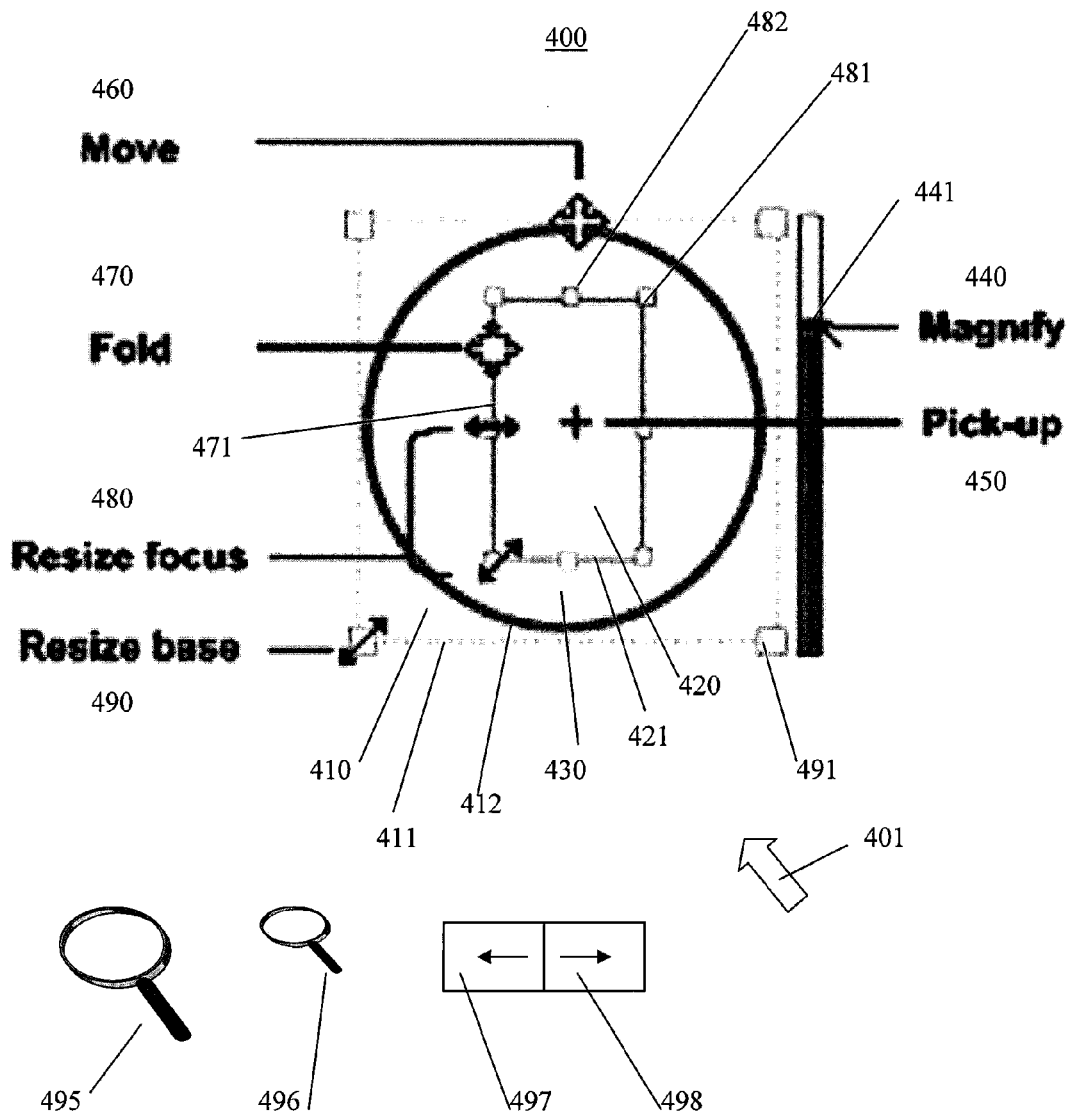
FIG. 4 is a partial screen capture illustrating a GUI having lens control elements for user interaction with detail-in-context data presentations in accordance with an embodiment of the invention.

FIG. 4 is a partial screen capture illustrating a GUI 400 having lens control elements for user interaction with detail-in-context data presentations in accordance with an embodiment of the invention. Detail-in-context data presentations are characterized by magnification of areas of an image where detail is desired, in combination with compression of a restricted range of areas of the remaining information (i.e., the context), the end result typically giving the appearance of a lens having been applied to the display screen surface. This lens 410 includes a "focal region" 420 having high magnification (or elevation), a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. As mentioned above, the base of the lens 412 may be coextensive with the focal region 420.

In general, the GUI 400 has lens control elements that, in combination, provide for the interactive control of the lens 410. The effective control of the characteristics of the lens 410 by a user (i.e., dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g., a mouse) with the motion resulting in an appropriate change in the corresponding lens characteristic. As will be described, selection of which lens control element is actively controlled by the motion of the pointing device 310 at any given time is determined by the proximity of the icon representing the pointing device 310 (e.g., cursor) on the display surface 340 to the appropriate component of the lens 410. For example, "dragging" of the pointing device at the periphery of the bounding rectangle of the lens base 412 causes a corresponding change in the size of the lens 410 (i.e., "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2D or 3D (or even greater numbers of dimensions) input devices including a trackball, a keyboard, a position tracking device, an eye tracking device, an input from a navigation device, etc.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e., mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e., a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, zoom, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491 magnify slide bar icon 440, zoom icon 495, and scoop slide bar icon (not shown). Typically, these icons are displayed simultaneously after selection of the lens 410. In addition, when the cursor 401 is located within the extent of a selected lens 410, an alternate cursor icon 460, 470, 480, 490, 495 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440. For example, when resizing the base 412 of a lens 410 using a corner handle 491, the cursor 401 will change form to a resize icon 490 once it is pointed at (i.e., positioned over) the corner handle 491. The cursor 401 will remain in the form of the resize icon 490 until the cursor 401 has been moved away from the corner handle 491.

Lateral movement of a lens 410 is provided by the move lens control element of the GUI 400. This functionality is accomplished by the user first selecting the lens 410 through a point and click operation. Then, the user points to a point within the lens 410 that is other than a point lying on a lens control icon 450, 412, 411, 421, 481, 482, 491, 440. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resizing of the base 412 (or outline or shoulder region) of a lens 410 is provided by the resize base lens control element of the GUI. After the lens 410 is selected, a bounding rectangle icon 411 is displayed surrounding the base 412. For a rectangular shaped base 412, the bounding rectangle icon 411 may be coextensive with the perimeter of the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles will change the proportions of the base 412. That is, the middle handles change the aspect ratio of the base 412 (i.e., the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle may include arrows indicating width resizing or height resizing. After pointing at the desired handle 491 the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resizing of the focal region 420 of a lens 410 is provided by the resize focus lens control element of the GUI. After the lens 410 is selected, a bounding rectangle icon 421 is displayed surrounding the focal region 420. For a rectangular shaped focal region 420, the bounding rectangle icon 421 may be coextensive with the perimeter of the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e., the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Folding of the focal region 420 of a lens 410 is provided by the fold control element of the GUI. In general, control of the degree and direction of folding (i.e., skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the shoulder region or lens base 412. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnification (i.e., elevation) of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e., if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Zoom functionality is provided by the zoom lens control element of the GUI. Referring to FIG. 2, the zoom lens control element, for example, allows a user to quickly navigate to a region of interest 233 within a continuous view of a larger presentation 210 and then zoom in to that region of interest 233 for detailed viewing or editing. Referring to FIG. 4, the combined presentation area covered by the focal region 420 and shoulder region 430 and surrounded by the base 412 may be referred to as the "extent of the lens". Similarly, the presentation area covered by the focal region 420 may be referred to as the "extent of the focal region". The extent of the lens may be indicated to a user by a base bounding rectangle 411 when the lens 410 is selected. The extent of the lens may also be indicated by an arbitrarily shaped figure that bounds or is coincident with the perimeter of the base 412. Similarly, the extent of the focal region may be indicated by a second bounding rectangle 421 or arbitrarily shaped figure. The zoom lens control element allows a user to: (a) "zoom in" to the extent of the focal region such that the extent of the focal region fills the display screen 340 (i.e., "zoom to focal region extent"); (b) "zoom in" to the extent of the lens such that the extent of the lens fills the display screen 340 (i.e., "zoom to lens extent"); or, (c) "zoom in" to the area lying outside of the extent of the focal region such that the area without the focal region is magnified to the same level as the extent of the focal region (i.e., "zoom to scale").

In particular, after the lens 410 is selected, a bounding rectangle icon 411 is displayed surrounding the base 412 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function. To zoom in to the extent of the focal region such that the extent of the focal region fills the display screen 340 (i.e., "zoom to focal region extent"), the user would point and click within the extent of the focal region. To zoom in to the extent of the lens such that the extent of the lens fills the display screen 340 (i.e., "zoom to lens extent"), the user would point and click within the extent of the lens. Or, to zoom in to the presentation area without the extent of the focal region, such that the area without the extent of the focal region is magnified to the same level as the extent of the focal region (i.e., "zoom to scale"), the user would point and click without the extent of the lens. After the point and click operation is complete, the presentation is locked with the selected zoom until a further zoom operation is performed.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the base 412 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

The concavity or "scoop" of the shoulder region 430 of the lens 410 is provided by the scoop lens control element of the GUI. After the lens 410 is selected, the scoop control is presented to the user as a slide bar icon (not shown) near or adjacent to the lens 410 and typically below the lens 410. Sliding the bar (not shown) of the slide bar results in a proportional change in the concavity or scoop of the shoulder region 430 of the lens 410. The slide bar not only informs the user that the shape of the shoulder region 430 of the lens 410 may be selected, but also provides the user with an indication as to what degree of shaping is possible. The slide bar includes a bar that may be slid left and right, or up and down, to adjust and indicate the degree of scooping. To control the degree of scooping, the user would click on the bar of the slide bar and drag in the direction of desired scooping degree. Once the desired degree of scooping is reached, the user would release the mouse button 310. The lens 410 is then locked with the selected scoop until a further scooping operation is performed.

Advantageously, a user may choose to hide one or more lens control icons 450, 412, 411, 421, 481, 482, 491, 440, 495 shown in FIG. 4 from view so as not to impede the user's view of the image within the lens 410. This may be helpful, for example, during an editing or move operation. A user may select this option through means such as a menu, toolbar, or lens property dialog box.

In addition, the GUI 400 maintains a record of control element operations such that the user may restore pre-operation presentations. This record of operations may be accessed by or presented to the user through "Undo" and "Redo" icons 497, 498, through a pull-down operation history menu (not shown), or through a toolbar.

Thus, detail-in-context data viewing techniques allow a user to view multiple levels of detail or resolution on one display 340. The appearance of the data display or presentation is that of one or more virtual lenses showing detail 233 within the context 234 of a larger area view 210. Using multiple lenses in detail-in-context data presentations may be used to compare two regions-of-interest at the same time. Folding enhances this comparison by allowing the user to pull the regions-of-interest closer together. Moreover, using detail-in-context technology, a region-of-interest can be magnified to pixel level resolution, or to any level of detail available from the source information, for in-depth review. The digital images may include graphic images, maps, photographic images, or text documents, and the source or original information may be in raster, vector, or text form.

For example, in order to view a selected object or region-of-interest in detail, a user can define a lens 410 over the object or region-of-interest using the GUI 400. The lens 410 may be introduced to the original image to form the a presentation through the use of a pull-down menu selection, tool bar icon, etc. Using lens control elements for the GUI 400, such as move, pickup, resize base, resize focus, fold, magnify, zoom, and scoop, as described above, the user adjusts the lens 410 for detailed viewing of the object or region-of-interest. Using the magnify lens control element, for example, the user may magnify the focal region 420 of the lens 410 to pixel quality resolution revealing detailed information pertaining to the selected object or region-of-interest. That is, a base image (i.e., the image outside the extent of the lens) is displayed at a low resolution while a lens image (i.e., the image within the extent of the lens) is displayed at a resolution based on a user selected magnification 440, 441.

In operation, the data processing system 300 employs EPS techniques with an input device 310 and GUI 400 for selecting objects or regions-of-interest for detailed display to a user on a display screen 340. Data representing an original image or representation is received by the CPU 320 of the data processing system 300. Using EPS techniques, the CPU 320 processes the data in accordance with instructions received from the user via an input device 310 and GUI 400 to produce a detail-in-context presentation. The presentation is presented to the user on a display screen 340. It will be understood that the CPU 320 may apply a transformation to the shoulder region 430 surrounding the region-of-interest 420 to affect blending or folding in accordance with EPS techniques. For example, the transformation may map the region-of-interest 420 and/or shoulder region 430 to a predefined lens surface 230, defined by a transformation or distortion function and having a variety of shapes, using EPS techniques. Or, the lens 410 may be simply coextensive with the region-of-interest 420.

The lens control elements of the GUI 400 are adjusted by the user via an input device 310 to control the characteristics of the lens 410 in the detail-in-context presentation. Using an input device 310 such as a mouse, a user adjusts parameters of the lens 410 using icons and scroll bars of the GUI 400 that are displayed over the lens 410 on the display screen 340. The user may also adjust parameters of the image of the full scene. Signals representing input device 310 movements and selections are transmitted to the CPU 320 of the data processing system 300 where they are translated into instructions for lens control.

Moreover, the lens 410 may be added to the presentation before or after the object or region-of-interest is selected. That is, the user may first add a lens 410 to a presentation or the user may move a pre-existing lens into place over the selected object or region-of-interest. The lens 410 may be introduced to the original image to form the presentation through the use of a pull-down menu selection, tool bar icon, etc.

Advantageously, by using a detail-in-context lens 410 to select an object or region-of-interest for detailed information gathering, a user can view a large area (i.e., outside the extent of the lens 410) while focusing in on a smaller area (i.e., within the focal region 420 of the lens 410) including and/or surrounding the selected object or region-of-interest. This makes it possible for a user to accurately gather detailed information without losing visibility or context of the portion of the original image surrounding the selected object or region-of-interest.

As mentioned above, the growth of the Internet and online map presentation technologies has resulted in broad availability of online and interactive presentation of maps and geographically relevant photographic images. Similarly, geospatial software applications and online services such as Google Earth™ have provided online access to photorealistic representations of cities, in some cases with knowledge of the locations and representative geometry of buildings. However, in such urban landscape presentations, one of the areas of concern is occlusion of buildings or other entities of interest (i.e., regions-of-interest, objects-of-interest) to the user by buildings that are in the line of sight between the user and a building that may be of interest. For example, a user may have a potential interest in the existence of a building housing a bookstore or coffee shop on the next block but may not be aware of it because of buildings near his present viewing location that occlude the building of potential interest. Various approaches to occlusion resolution have been attempted for 3D visualization, such as the 3D lens approach of Cowperthwaite (see U.S. Pat. No. 6,798,412 to Cowperthwaite, which is incorporated herein by reference) and the building height adjustment of Yano (see U.S. Pat. No. 5,999,879 to Yano, which is incorporated herein by reference). However, these approaches cause displacements of building locations and/or building height adjustments that can be very disorienting to the user, and can be expensive in terms of the required computations.

The present invention provides a method of reducing or eliminating occlusion in such urban landscape presentations so as to reveal a building or region-of-interest, without the need for the user to change viewing location. The method is efficient in graphical operations for the purpose of interactive performance on geometric models of urban landscapes. The method provides efficient modification of building rendering order and geometry, and a virtual lens-mediated variable transparency, in order to reduce or eliminate occlusion.

Figure 5:
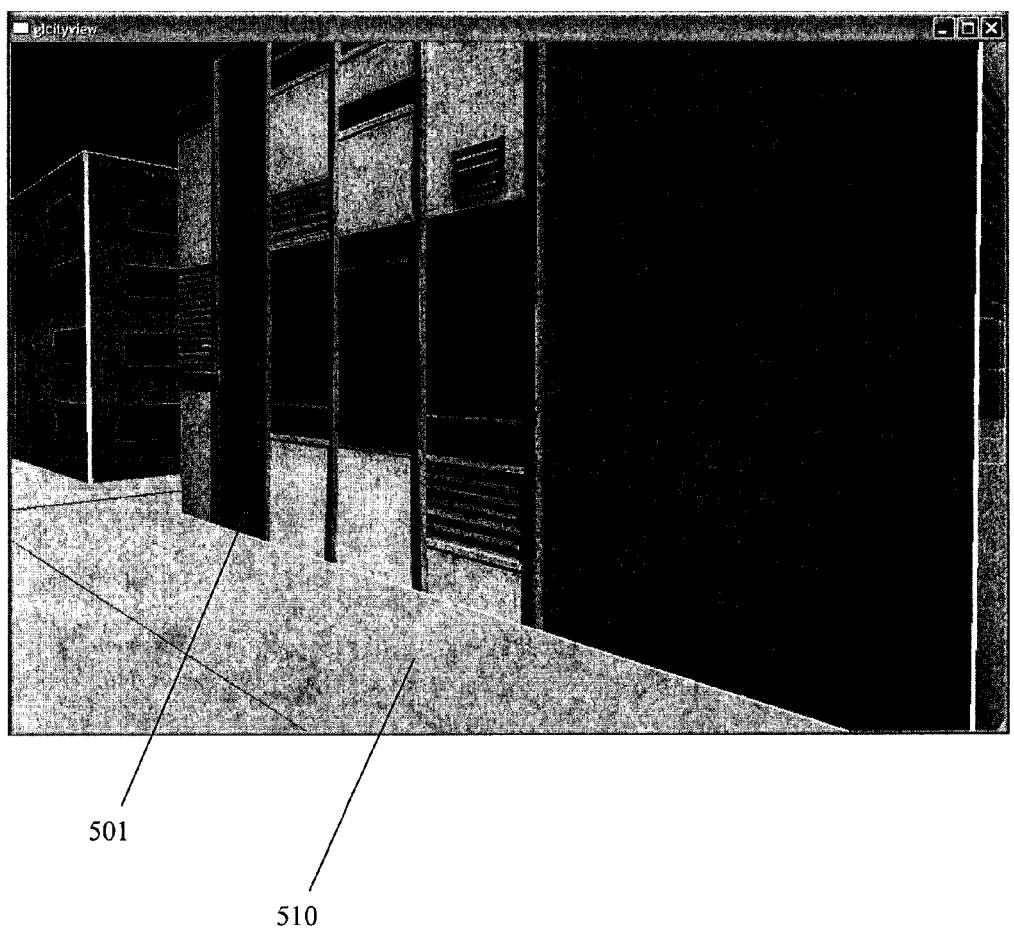
FIG. 5 is a screen capture illustrating a city block within an urban landscape representation in accordance with an embodiment of the invention.

FIG. 5 is a screen capture illustrating a city block within an urban landscape representation 500 in accordance with an embodiment of the invention. FIG. 5 shows a representation (or original image) of a view of buildings within a city, wherein the buildings (e.g., 501) in the line of sight of the user and close to the viewpoint of the user block the view of buildings (e.g., 601 in FIG. 6) located at a greater distance from the viewpoint. In FIG. 5, the user's viewpoint is situated at a particular city block within an urban landscape representation. The user is unable to view buildings 601 of potential interest on adjacent blocks due to occlusion by the buildings 501 located immediately in front of the viewpoint (i.e., in the foreground 510).

Figure 6:
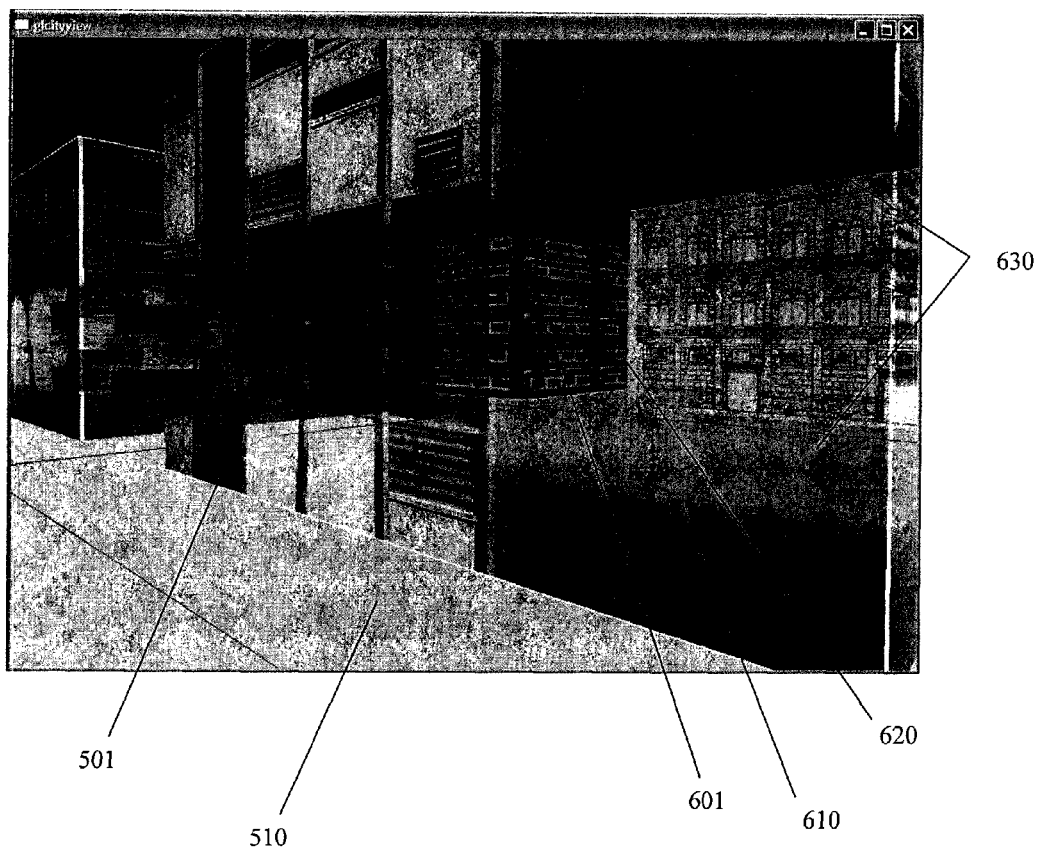
FIG. 6 is a screen capture illustrating a presentation in which a detail-in-context transparency lens has been applied to the representation of FIG. 5 to reduce occlusion of a region-of-interest, in accordance with an embodiment of the invention; and, FIG. 7 is a flow chart illustrating operations of modules within the memory of a data processing system for generating a presentation of a region-of-interest within an original image for display on a display screen, the region-of-interest being at a depth within the original image and being occluded by a portion of the original image at a lesser depth, in accordance with an embodiment of the invention.

FIG. 6 is a screen capture illustrating a presentation 600 in which a detail-in-context transparency lens 610 has been applied to the representation 500 of FIG. 5 to reduce occlusion of a region-of-interest 601, in accordance with an embodiment of the invention. In FIG. 6, application of the transparency lens 610 reveals buildings 601 on adjacent blocks through controlled application of transparency as specified by the lens 610, without a change in the viewpoint of the user.

According to the present invention, the original landscape geometry (i.e., the original image or geometry of buildings) 500 is first converted into a mesh of convex polygons in which each building 501, 601 has its own polygon. (This step is unnecessary if the landscape geometry is already essentially in this form.) This allows an efficient search for nearby buildings 601, such that the neighbourhood representation can later be rendered in far to near order. The buildings 501, 601 are then sliced into slices normal to the z (height) axis and an opacity or transparency ("alpha value") is applied as a function of depth into the landscape 500. The alpha value is also varied in z to provide a smooth transparency transition 630 to the buildings 501 in the foreground 510 to preserve the user's awareness of the original foreground buildings 501. The visual appearance is that of a one-dimensional lens such as a one-dimensional Elastic Presentation Space lens (see U.S. Pat. No. 6,768,497 to Baar, which is incorporated herein by reference), with the focal region 620 for the region-of-interest 601 having maximum alpha and the shoulder region or regions 630 providing a gradual transition into the foreground 510. (Higher dimensional lenses can also be applied, at the expense of more complex computations.) If desired, a magnification of the focal region 620 can also be generated as described above. Through the result of the slicing operation, the lens shoulders 630 can efficiently be assigned decreasing alpha values with vertical distance from the focal region 620, to present an apparently smoothly varying transparency transition to the foreground 510 for the user. Maximum alpha is constant in FIG. 6 but can vary with depth.

According to one embodiment, the alpha value may be adjusted with a lens control element of the GUI 400. That is, the transparency of the lens 610 may be provided by a transparency lens control element of the GUI 400. For example, after the lens 610 is selected, the transparency control may be presented to the user as a slide bar icon (not shown but similar to 440) near or adjacent to the lens 610 and typically to one side of the lens 610. Sliding the bar (not shown but similar to 441) of the slide bar results in a proportional change in the alpha value or transparency of the lens 610. Of course, the alpha value/transparency may be adjusted through other means such as by selection from a menu, etc.

According to one embodiment, the original image or representation is a computer aided design ("CAD") image. The CAD image may include an image of a three-dimensional ("3D") mechanical assembly, etc. In this case, rather than a first building occluding a second building as in an urban landscape image (e.g., 500), a first component of the mechanical assembly may occlude a second component in the image of the mechanical assembly. The transparency lens method for occlusion resolution or reduction described above may be used for such 3D CAD images.

Figure 7:
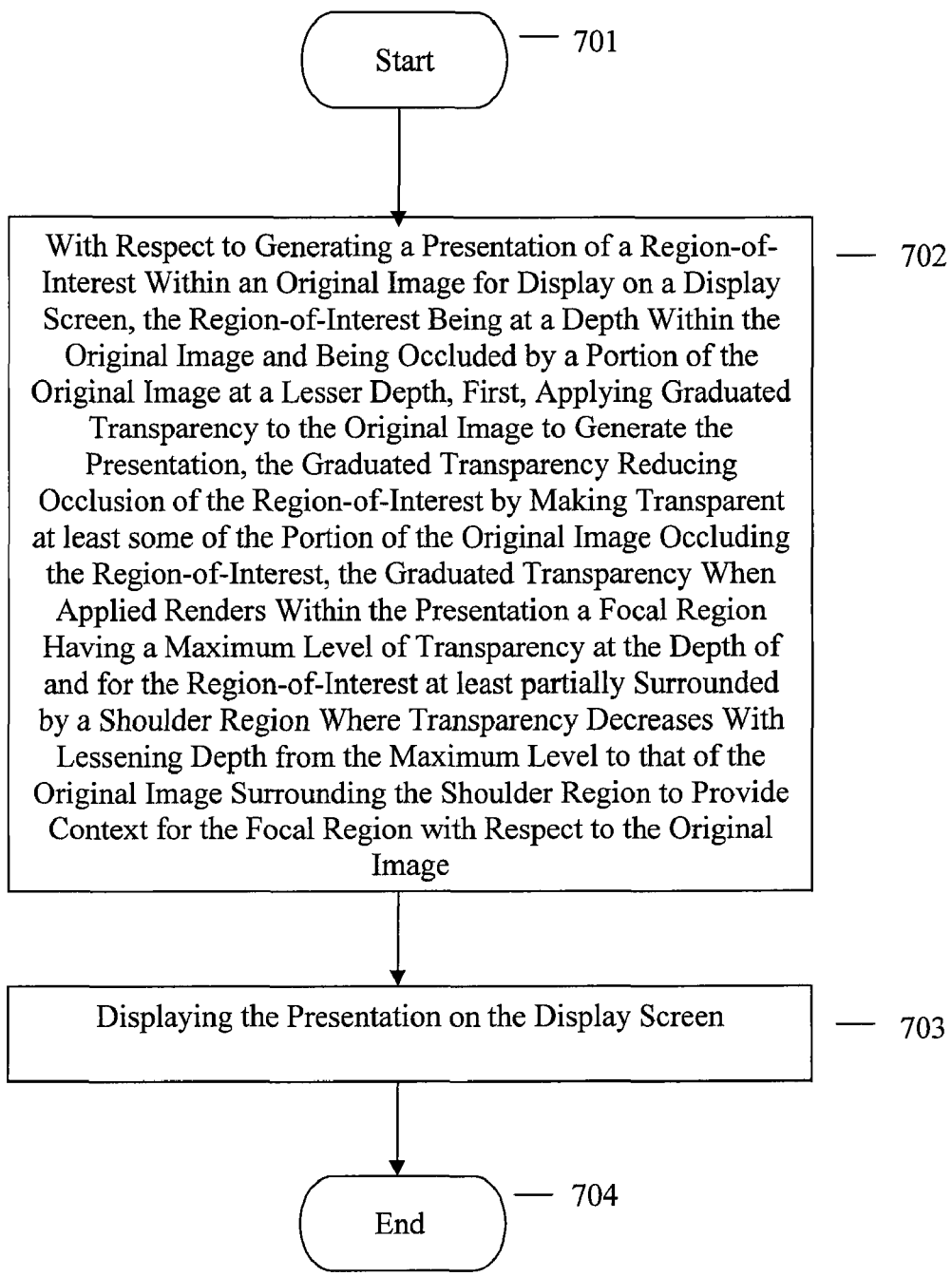

Aspects of the above described method may be summarized with the aid of a flowchart. FIG. 7 is a flow chart illustrating operations 700 of modules 331 within the memory 330 of a data processing system 300 for generating a presentation 600 of a region-of-interest 601 within an original image 500 for display on a display screen 340, the region-of-interest 601 being at a depth within the original image 500 and being occluded by a portion 501 of the original image 500 at a lesser depth, in accordance with an embodiment of the invention.

At step 701, the operations 700 start.

At step 702, graduated transparency 610 is applied to the original image 500 to generate the presentation 600, the graduated transparency 610 reducing occlusion of the region-of-interest 601 by making transparent at least some of the portion 501 of the original image 500 occluding the region-of-interest 601, the graduated transparency 610 when applied renders within the presentation 600 a focal region 620 having a maximum level of transparency at the depth of and for the region-of-interest 601 at least partially surrounded by a shoulder region 630 where transparency decreases with lessening depth from the maximum level to that of the original image 500 surrounding the shoulder region 630 to provide context for the focal region 620 with respect to the original image 500.

At step 703, the presentation 600 is displayed on the display screen 340.

At step 706, the operations 700 end.

In the above method, the region-of-interest may be a first object 601 and the portion of the original image at the lesser depth may be a second object 501. The first and second objects 501, 601 may be modelled as first and second convex polygons, respectively. The method may further include dividing the second polygon into one or more slices, each slice being made at a respective depth into the representation 500. The method may further include assigning each slice a respective level of transparency that increases with depth to thereby apply the graduated transparency 610. The original image may be an urban landscape image 500. The first and second objects may be first and second buildings 501, 601, respectively. The method may further include receiving a signal for adjusting the maximum level of transparency in the focal region 620. The signal for adjusting the maximum level of transparency may be received through a slide bar icon (e.g., similar to 440, 441). The maximum level of transparency may be fully transparent. The method may further include receiving a signal for adjusting the transparency in the shoulder region 630 (i.e., the rate of decrease of transparency or the scoop of the transparency lens). The signal for adjusting the transparency may be received through a slide bar icon. The method may further include receiving a signal for adjusting an extent of the focal region 620. The signal for adjusting the extent of the focal region 620 may be received through at least one handle icon 481, 482 positioned on a perimeter of the focal region 620. The method may further include receiving a signal for adjusting an extent of the shoulder region 630. The signal for adjusting the extent of the shoulder region may be received through at least one handle icon 491 positioned on a perimeter of the shoulder region 630. The focal region 620 may include a magnification for the region-of-interest 601 and the magnification may decrease in the shoulder region 630 to that of the original image 500 surrounding the shoulder region 630. The method may further include receiving a signal for adjusting the magnification. The signal for adjusting the magnification may be received through a slide bar icon 440, 441. The original image 500 may be a computer aided design ("CAD") image. And, the CAD image 500 may be an image of a three-dimensional mechanical assembly and the first and second objects 501, 601 may be first and second components, respectively, of the mechanical assembly.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 can be contained in a data carrier product according to one embodiment of the invention. This data carrier product can be loaded into and run by the data processing system 300. In addition, the sequences of instructions which when executed cause the method described herein to be performed by the data processing system 300 can be contained in a computer software product according to one embodiment of the invention. This computer software product can be loaded into and run by the data processing system 300. Moreover, the sequences of instructions which when executed cause the method described herein to be performed by the data processing system 300 can be contained in an integrated circuit product (e.g., a hardware module or modules) including a coprocessor or memory according to one embodiment of the invention. This integrated circuit product can be installed in the data processing system 300.

The embodiments of the invention described above are intended to be exemplary only. Those skilled in the art will understand that various modifications of detail may be made to these embodiments, all of which come within the scope of the invention.

The invention claimed is:

1. A method for generating a graphical presentation from a data representation, the method comprising:
  applying a transparency lens to reveal a region-of-interest within an original image, wherein the region-of-interest is occluded by an occluding portion of the original image;
  wherein the transparency lens includes:
    a focal region having a transparency to reduce occlusion of the region-of-interest by the occluding portion, and
    a shoulder region between the focal region and a foreground of the original image, wherein the shoulder region has decreasing transparency as depth decreases from the focal region to the foreground.

2. The method of claim 1, further comprising slicing the occluding portion into slices normal to a depth axis of the original image; and
  applying transparencies to the slices as a function of depth of the slices to form the shoulder region.

3. The method of claim 2, wherein the occluding portion comprises an occluding polygon.

4. The method of claim 3, further comprising converting the original image into a mesh of polygons including the occluding polygon.

5. The method of claim 1, wherein the original image comprises a landscape image;
  wherein the occluding portion comprises a first building; and
  wherein the region-of-interest comprises a second building.

6. The method of claim 1, wherein the original image comprises a computer-aided design ("CAD") image;
  wherein the occluding portion comprises a first component; and
  wherein the region-of-interest comprises a second component.

7. The method of claim 1, further comprising adjusting the transparency of the focal region through a graphical user interface ("GUI").

8. The method of claim 7, further comprising adjusting the transparency of the shoulder region through the GUI.

9. The method of claim 1, further comprising adjusting an extent of the focal region through a GUI.

10. The method of claim 1, wherein the focal region further includes a magnification; and
  wherein at least a portion of the shoulder region has a magnification that is less than the magnification of the focal region and greater than a magnification of the foreground.

11. At least one non-transitory computer-readable medium including program instructions, the program instructions comprising:
  lens application instructions for applying a transparency lens to reveal a region-of-interest within an original image, wherein the region-of-interest is occluded by an occluding portion of the original image;

wherein the transparency lens includes:
a focal region having a transparency to reduce occlusion of the region-of-interest by the occluding portion, and
a shoulder region between the focal region and a foreground of the original image, wherein the shoulder region has decreasing transparency as depth decreases from the focal region to the foreground.

12. The program instructions of claim 11, further comprising slicing instructions for slicing the occluding portion into slices normal to a depth axis of the original image; and
applying transparencies to the slices as a function of depth of the slices to form the shoulder region.

13. The program instructions of claim 12, wherein the occluding portion comprises an occluding polygon.

14. The program instructions of claim 13, further comprising conversion instructions for converting the original image into a mesh of polygons including the occluding polygon.

15. The program instructions of claim 11, wherein the original image comprises a landscape image;
wherein the occluding portion comprises a first building; and
wherein the region-of-interest comprises a second building.

16. The program instructions of claim 11, wherein the original image comprises a computer-aided design ("CAD") image;
wherein the occluding portion comprises a first component; and
wherein the region-of-interest comprises a second component.

17. The program instructions of claim 11, further comprising adjustment instructions for adjusting the transparency of the focal region through a graphical user interface ("GUI").

18. The program instructions of claim 17, further comprising adjustment instructions for adjusting the transparency of the shoulder region through the GUI.

19. The program instructions of claim 11, further comprising adjustment instructions for adjusting an extent of the focal region through a GUI.

20. The program instructions of claim 11, wherein the focal region further includes a magnification; and
wherein at least a portion of the shoulder region has a magnification that is less than the magnification of the focal region and greater than a magnification of the foreground.

* * * * *

UNITED STATES PATENT AND TRADEMARK OFFICE
CERTIFICATE OF CORRECTION

PATENT NO.      : 8,194,972 B2
APPLICATION NO. : 13/178813
DATED           : June 5, 2012
INVENTOR(S)     : Tigges Page 1 of 1

It is certified that error appears in the above-identified patent and that said Letters Patent is hereby corrected as shown below:

On Page 4, in Field (56), under "OTHER PUBLICATIONS", in Column 2, Line 67, delete "Proceedins" and insert -- Proceedings --, therefor.

On Page 5, in Field (56), under "OTHER PUBLICATIONS", in Column 2, Line 3, delete ") (1995-," and insert -- 1995, --, therefor.

On Page 5, in Field (56), under "OTHER PUBLICATIONS", in Column 2, Line 29, delete "Ineract" and insert -- Interact --, therefor.

In Column 14, Line 4, delete "form the a" and insert -- form a --, therefor.

Signed and Sealed this
Twenty-third Day of October, 2012

David J. Kappos
*Director of the United States Patent and Trademark Office*